May 27, 1969 R. STARER ET AL 3,447,022
WAVEFORM REPRODUCTION
Filed Sept. 12, 1967

INVENTORS.
ROBERT STARER
JOHN P. SKURLA
BY
Paul & Paul
ATTORNEYS.

3,447,022
WAVEFORM REPRODUCTION
Robert Starer, Rydal, and John P. Skurla, Warminster, Pa., assignors to Physitech, Incorporated, Willow Grove, Pa., a corporation of Pennsylvania
Filed Sept. 12, 1967, Ser. No. 667,237
Int. Cl. H01j *31/26*
U.S. Cl. 315—10          9 Claims

ABSTRACT OF THE DISCLOSURE

An electrical signal is produced corresponding to a complex curve or waveform available visually on a storage medium such as a photograph. The signal is produced by scanning the visual record or photograph of the curve or waveform with a light beam generated by a cathode ray tube and deflected vertically and horizontally. The change in reflected light which occurs as the scanning beam of light crosses the waveform is sensed by a photosensitive device, preferably a photo-multiplier, and a determination is made as to what points in the vertical (for example) deflection cycle the changes in reflected light occur. This determination provides an electrical signal which is representative of the curve or waveform being scanned. The electrical signal thus produced may be displayed as a visual reproduction of the original curve or waveform.

CROSS REFERENCES TO RELATED APPLICATION

Figure 1:
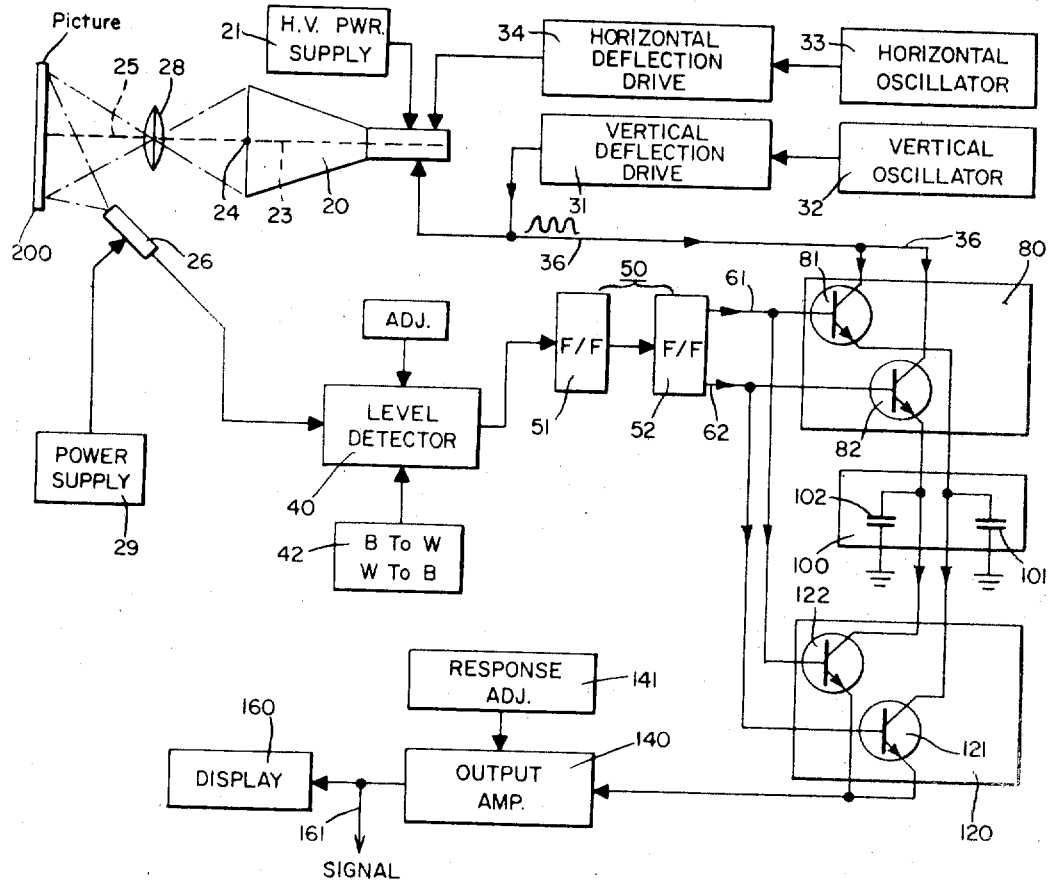

A portion of the circuitry used in the present application is similar to that disclosed in the copending application of Robert Starer (one of the co-inventors in the present application) in an application filed by Starer on Nov. 26, 1965, Ser. No. 509,786, entitled, "Electro-Optical Displacement Indicator."

FIELD OF THE INVENTION

This invention relates to electrical waveforms and to waveform analysis and to the provision of means for developing electrical signals corresponding to visually available curves and electrical waveforms, and for regenerating and visually presenting such waveforms.

DESCRIPTION OF THE PRIOR ART

Applicant is aware of the following related prior art patents: Sunstein 2,455,532; Haynes 2,462,263; Sunstein 2,528,020; Sustein 2,922,049 and Fitzmaurice et al. 2,974,254.

SUMMARY OF THE INVENTION

In the above, as well as in other prior art systems designed for following a complex curve, or for generating signals corresponding to a complex waveform, feedback or servo-loop signals are employed. In contrast thereto, the system of the present invention does not employ servo system techniques. There is no feedback to the deflection circuits of the cathode ray tube. Instead, the waveform is scanned by a spot of light, and the values of the deflection signal are measured at each instant the optical discontinuity between dark and light is sensed. These instantaneous measurements of the deflection signal provide the information which defines the curve or waveform being scanned.

BRIEF DESCRIPTION AF THE DRAWING

Figure 2:
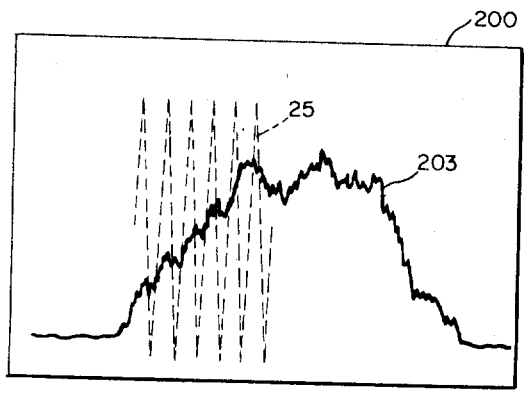
Figure 3:
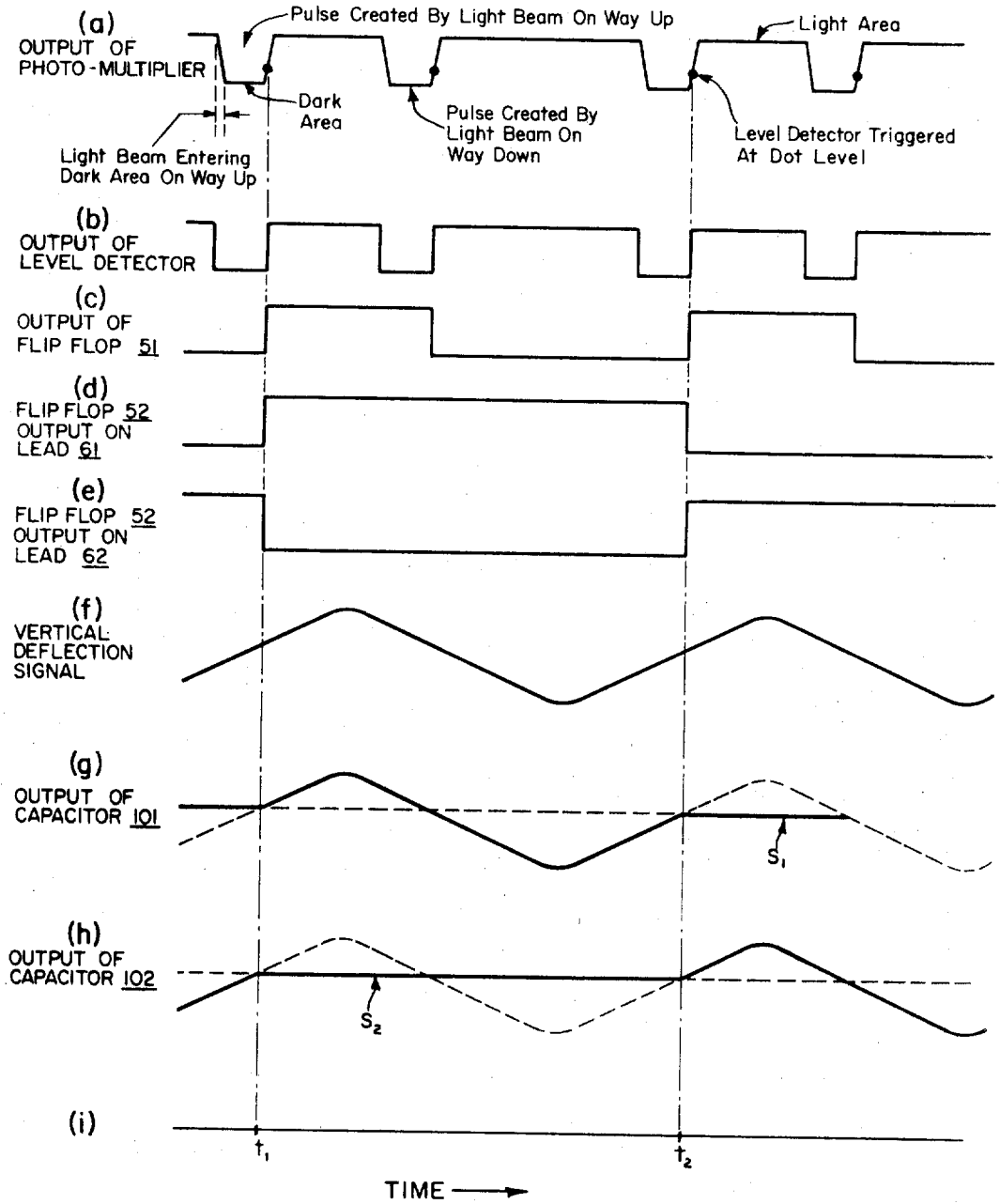

FIG. 1 is a block diagram of a waveform reproduction system embodying the present invention;
FIG. 2 is merely an example of a waveform which is to be reproduced, or with respect to which reproduction signals are to be generated;
FIG. 3 shows representative waveforms at various points in the system of FIG. 1.

DESCRIPTION OF THE PREFERRED EMBODIMENTS

Referring now to FIG. 1, a photograph 200 of a waveform 203 is scanned by a beam of light 25 generated by the cathode ray tube 20 and focused as by lens 28 on the surface of the photograph 200. The photograph 200 may be either a negative or a positive. FIG. 2 depicts a black waveform 203 on a bright background, but the system about to be described will, of course, also operate where the waveform is bright and the background dark. In practice, the latter will be more frequently the case, since the photograph 200 will ordinarily be a negative, rather than a positive. However, a positive is more easily shown in the patent drawing and, accordingly, it will be assumed that the waveform is dark, as is illustrated in FIG. 2.

Cathode ray tube 20 is a well-known device and no detailed description thereof is required. The high voltage required is supplied by the power supply 21. A sharply focused cathode ray beam 23 is projected by the gun against the phosphor screen forming the spot of light 24 which produces the light beam 25. The cathode ray beam 23 is deflected horizontally by the horizontal deflection means 33, 34, and is deflected vertically by the vertical deflection means 31, 32. So far as the present invention is concerned either electrostatic or electromagnetic deflection may be used.

A photo-sensitive device 26, which may be a photo-diode or photo-transistor but which is preferably a photo-multiplier tube, is so positioned as to receive all of the light reflected from the face of the photograph 200 which is being scanned. Power for the photo-multiplier tube 26 is supplied by the power supply 29.

Where the waveform 203 being scanned is of the general type depicted in FIG. 2, the system will be operated at a relatively high vertical deflection frequency and a relatively low horizontal deflection frequency. Each time the deflected light beam 25 crosses the waveform 203 the light reflected from the photograph 200 on to the photo-multiplier tube 26 will decrease sharply, and the tube 26 will deliver a series of output pulses something like that shown graphically in FIG. 3(a). The repetition frequency of the pulses delivered from the photo-multiplier tube 26 will be twice the vertical deflection frequency, since the beam 25 will cross the waveform 203 twice for each cycle of vertical deflection. This assumes that the beam 25 is not blanked on the vertical retrace. (As mentioned later, the beam 25 may be blanked on vertical retrace, in which case circuit 50 will consist of but one flip-flop, not two in series as shown.)

The output of the photo-multiplier tube 26 (FIG. 3, waveform (a)) is applied to the level detector 40. The function of the level detector 40 is to convert the sloping-front frusto-conical pulses of FIG. 3(a) into steep-front rectangular pulses. Assume, for example, that level detector 40 has been adjusted to be triggered by a rising signal from the photo-multiplier tube 26 when it reaches a value corresponding to that represented by the dot on the upward slope of the trailing edge of the negative pulses of FIG. 3(a). In such case the level detector 40 is triggered and produces a steep-rising-front high-level signal at the time the dot value occurs. These steep-front high-level output signals from the level detector 40 are represented graphically in FIG. 3(b) and having a duration which extends between the trailing and leading edges of consecutive negative pulses from the photo-multiplier tube 26. It is assumed that the level detector is being operated in the black-to-white (B to W) mode, as controlled by circuit 42.

The high level output of detector 40 is applied to switch control circuit 50. This circuit comprises two flip-flops in series, identified as 51 and 52. Each flip-flop changes state only in response to positive pulse signals, i.e. pulses having a rising leading edge. Thus, the first flip-flop 51 changes its state in response to each positive-going signal from level detector 40 but the second flip-flop 52 changes its state only in response to every other such pulse from 40 since the first flip-flop 51 only delivers a positive-going signal in response to every other pulse from the level detector.

The second flip-flop 52 has two output leads 61 and 62, and assuming flip-flop 52 is in a stable state, a high level output appears on one of the leads and a low level output on the other. Which of the leads 61, 62 has the high level output and which the low, depends upon the state of flip-flop 52. In FIG. 3, waveform ($c$) represents the output from the first flip-flop 51, waveform 3($d$) represents the output level on lead 61, and waveform ($e$) represents the output level on lead 62.

The signals on lead 61 and 62 are applied to a storage input circuit 80 comprising a first pair of electronic switches 81 and 82. Switches 81 and 82 are preferably transistor switches, and are so shown in FIG. 1. Since one of the applied signals is high and the other low, one of these transistor switches will close (the transistor will conduct) and the other will open (the transistor will be cut off). It will be assumed that the circuit has been so arranged that a high level signal at the base electrode of the transistor closes the switch (the transistor conducts) and a low level signal opens the switch (the transistor is cut off). Thus, at time $t_1$ in FIG. 3($i$), the high level signal on lead 61 (FIG. 3($d$)) will close transistor switch 81, and the low level signal on lead 62 (FIG. 3($e$)) will open transistor switch 82.

The vertical deflection signal is shown graphically in FIG. 3($f$). This deflection signal is applied by way of lead 36 (see FIG. 1) to the collector electrodes of both transistors of the first pair of transistor switches 81 and 82, in parallel. If the transistor switch is conductive, the deflection signal is applied through the switch to the storage system 100.

Storage system 100 comprises capacitors 101 and 102. Capacitor 101 is connected in series with the collector-emitter circuit of transistor switch 81. Capacitor 102 is connected in series with the collector-emitter ciruit of transistor switch 82. At a given time, one of these transistors is conductive and the other is non-conductive. Which one is conductive and which one is non-conductive depends upon the state of the flip-flop 52. The time constants are so selected that during the period a transistor switch of input circuit 80 is conductive the storage capacitor will follow the vertical deflecting signal which is flowing through the switch.

Storage capacitors 101 and 102 are each connected to an output amplifier 140 through a storage output circuit 120 comprising a second pair of transistor switches 121 and 122. If the transistor switch of the storage output circuit 120 is conductive, the capacitor voltage is applied to the output amplifier 140. If the transistor switch of output circuit 120 is non-conductive, the capacitor signal does not pass through. At a given time, one of the switches 121 or 122 is conductive, the other is non-conductive. Which one is conductive and which one is non-conductive depends upon the state of the flip-flop 52, since the base electrodes of transistors 121 and 122 are connected to the output leads 62 and 61 respectively of flip-flop 52. Thus, switch 122 is always in the same condition as switch 81, and switch 121 is always in the same condition as switch 82. In other words, the switches of circuits 80 and 120 which are always in the same condition are in different series circuits. Transistor switches 81 and 121 which are always in the opposite conditions are connected in series between the vertical signal source and the output amplifier 140, and switches 82 and 122 which are also always in opposite conditions are also connected in series. The storage capacitor 101 is connected between the common junction point of switches 81 and 121 and ground. The storage capacitor 102 is connected between the common junction point of switches 82 and 122 and ground. Thus, when the first switch of one series pair of switches is closed, allowing the capacitor to follow the input signal, the second switch of the series pair is open. At this time, the first switch of the other series pair is open and the second switch of the pair is closed. Thus, the capacitor signal is applied through the second switch to the output amplifier 140.

In FIG. 3, the waveform ($g$) illustrates the signal on the output side of the storage capacitor 101, and waveform ($h$) illustrates the signal on the output side of the storage capacitor 102. Note that a time $t_1$ (FIG. 3($i$)) the signal level on output lead 61 of flip-flop 52 goes high (waveform FIG. 3($d$)), while the signal level on output lead 62 goes low (waveform FIG. 3($e$)). As a result, transistor switches 81 and 122 become conductive while transistor switches 82 and 121 become non-conductive. The vertical scanning signal on lead 36 passes through transistor switch 81 into storage capacitor 101 and storage capacitor 101 follows the vertical scanning signal, as illustrated in FIG. 3($g$). Transistor switch 121 on the output side of capacitor 101 is non-conductive and no signal passes to the output amplifier 140.

As mentioned above, at time $t_1$ when the signal level on output lead 62 of flip-flop 52 goes down, transistor switches 82 and 121 become non-conductive. The vertical scanning signal on lead 36 is blocked from storage capacitor 102 by the non-conductive transistor switch 82, but the instantaneous voltage which appeared across capacitor 102 at the instant switch 82 became non-conductive (i.e. the capacitor signal at time $t_1$) is now applied through the conductive transistor switch 122 to the output amplifier 140. The capacitor 102 sees a high impedance circuit, and the instantaneous signal which is across the capacitor at time $t_1$ is substantially maintained for the period of the vertical deflection cycle. The signal is illustrated in FIG. 3 by that portion of the waveform ($h$) which is identified as signal $S_2$, extending from time $t_1$ to time $t_2$. At time $t_2$ in response to the signal from level detector 40, the flip-flop 52 changes its state, and the signal level on output lead 61 falls while the signal on output lead 62 rises. Transistor switches 82 and 121 now conduct, while switches 81 and 122 become non-conductive. Storage capacitor 101, at instant $t_2$ had a signal thereacross corresponding to the instantaneous value of the vertical deflection signal at that instant. This signal, identified as $S_1$ in FIG. 3 ($g$), is applied by capacitor 101 through the conductive transistor switch 121 to the output amplifier 140.

It will be seen from the foregoing that the output signal from amplifier 140 will be made up of signals $S_1$ and $S_2$ derived alternately from storage capacitors 101 and 102. A filter 141, identified in FIG. 1 as a response time adjustment, is used to take out the switching transients which would otherwise exist in the amplifier output signal at time instants corresponding to the time instants when the flip-flop 52 of switch control 50 is changing from one state to the other. In FIG. 1, the output from amplifier 140 is shown applied to a display device 160, such as a cathode ray tube, and also to a signal channel 161 which may utilize the signal for any of a wide variety of purposes.

It will be seen that the output signal from amplifier 140 is derived from, and corresponds to, the instantaneous value of the vertical deflection signal at the instant the light beam 25, during its upward deflection, crosses the optical discontinuity, which in the present illustration is waveform 203 of the photograph 200. Note that the light beam 25, during its downward deflection, is ineffective to produce an output signal. This is because of the use of flip-flops 51 and 52 in series. As has already been explained, the first flip-flop 51 changes its state in response to each pulse from the photo-multiplier tube 26, but the second flip-flop 52 changes its state in response to every other change of state of the first flip-flop. Thus, the second flip-flop 52 changes its state in response to every other pulse from the photo-multiplier 26. It will be understood, of course, that while the system illustrated herein has been described as responsive to the upward deflection of light beam 25 and not to the downward deflection, the system could be set up to respond to the downward and not to the upward deflection. It will also be understood that the cathode ray tube beam 23 is blanked during horizontal retrace but not during vertical retrace.

It will be clear from what has been said that each of the storage capacitors 101 and 102 alternately delivers to the output amplifier 140 a voltage signal corresponding to the value of the vertical deflection signal at the time the light beam 25 crosses the waveform 203 on the upward deflection of the beam. Thus, the waveform of the output signal from the output amplifier 140 will correspond to the waveform 203. To accomplish this, the frequency of the vertical deflection signal is, of course, selected to be at least as high as, and preferably higher than, the expected rate of vertical variations in the waveform 203.

A suitable circuit for the level detector 40 is shown and described in the copending application of Robert Starer, Ser. No. 509,786 filed Nov. 26, 1965, and referred to previously hereinbefore. Similarly, suitable circuits for the switch control flip-flop 52, for the transistor switch circuits 80 and 120, and for the storage or memory circuit 100, are also shown and described in the aforesaid pending application, Ser. No. 509,786.

In the present application, we have presented an abstract of the disclosure and a specific description of a preferred embodiment of our invention, as required. It is to be understood that neither the abstract nor the specific description of the preferred embodiment are to limit the scope of the invention, the breadth of which is defined in the claims appended hereto.

As previously mentioned, while the system illustrated and described assumes that the vertical deflection signal is not blanked on retract, the system could readily be designed to operate with the vertical deflection signal blanked on retrace. In such case, the switch control circuit 50 would employ but a single flip-flop.

What is claimed is:

1. Apparatus for generating an electrical signal corresponding to an optical discontinuity between areas of substantially different light refecticity, luminosity or transmissibility, said apparatus comprising: a visual record having an optical discontinuity; means for projecting a spot of light on said record; means for deflecting said spot of light successively across said record at a rate of speed which is high relative to the rate of movement of said spot in the direction normal thereto; a photo-sensitive device disposed to receive light from said record for developing electrical output signals corresponding to said light spot crossing said optical discontinuity; and means coupled to the output of said deflection means and also coupled to the output of said photo-sensitive device for developing a signal corresponding to the instantaneous value of the deflection signal at the instant that a change occurs in the output signal of said photo-sensitive device, thereby to develop a signal corresponding to the position on said record of said optical discontinuity.

2. Apparatus according to claim 1 characterized in that the means coupled to the output of the deflection signal means and also to the output of said photo-sensitive device includes electronic switch means which opens and closes in response to said photo-sensitive device output signal for controlling the passage therethrough of said deflection signal; signal storage means for receiving the deflection signal passing through said electronic switch means; and output means coupled to said storage means for delivering an output signal corresponding to the magnitude of said deflection signal at the instant said electronic switch means opens to block passage of said deflection signal to said storage means.

3. Apparatus according to claim 2, characterized in that at least one bistable circuit is inserted in series between the output of said photo-sensitive device and said electronic switch means; further characterized in that said switch means comprises a pair of electronic switches so coupled to said bistable circuit that one of said switches is in one condition and the other is in the opposite condition, according to the state of said bistable circuit; further characterized in that said signal storage means comprises a pair of capacitors, one connected to each switch; and further characterized in that the coupling between said storage means and said output means includes a pair of electronic output switches coupled to said bistable circuit so that one of said output switches is in one condition and the other is in the opposite condition, according to the state of said bistable circuit.

4. Apparatus according to claim 3 characterized in that said means for deflecting said spot of light across said record successively at a relatively high rate of speed comprise means for reciprocating said spot across said record, and further characterized in that two bistable circuits are connected in series between the output of said photo-sensitive device and said electronic switch means, thereby to control the passage of said deflection signal through said electronic switch means according to every other output signal from said photo-sensitive device, whereby said apparatus is responsive to said spot of light in only one of its reciprocating directions.

5. Apparatus according to claim 4 characterized in that said means for projecting a spot of light on said record comprises a cathode ray tube, and a focusing lens disposed between the screen of said cathode ray tube and said record.

6. Apparatus according to claim 5 characterized in that said means for deflecting said spot of light comprises vertical and horizontal deflection means for deflecting the beams of said cathode ray tube.

7. Apparatus according to claim 6 characterized in that said photo-sensitive device is a photo-multiplier tube.

8. Apparatus according to claim 7 characterized in that said electronic switch means are transistor switch means, and in that said storage means are capacitors.

9. Appratus according to claim 8 characterized by the provision of display means coupled to said output means for visually presenting a reproduction of said optical discontinuity.

References Cited

UNITED STATES PATENTS

| 2,845,572 | 7/1958 | Dietrich | 315—10 |
| 2,974,254 | 3/1961 | Fitzmaurice et al. | 315—10 |
| 2,994,779 | 8/1961 | Brouillette | 250—200 |
| 3,050,581 | 8/1962 | Bomba et al. | 178—7.1 |
| 3,333,144 | 7/1967 | Bulk | 315—10 |

RODNEY D. BENNETT, JR., *Primary Examiner.*

JEFFREY P. MORRIS, *Assistant Examiner.*

U.S. Cl. X.R.

178—7.2